United States Patent [19]

Long

[11] Patent Number: 5,495,295
[45] Date of Patent: Feb. 27, 1996

[54] USE OF TRANSMITTER ASSIGNED PHANTOM CHANNEL NUMBERS FOR DATA SERVICES

[75] Inventor: Michael E. Long, Oakbrook, Ill.

[73] Assignee: Zenith Electronics Corporation, Glenview, Ill.

[21] Appl. No.: 252,039

[22] Filed: Jun. 1, 1994

[51] Int. Cl.⁶ ............... H04N 7/00; H04N 5/445
[52] U.S. Cl. ............ 348/563; 348/731; 348/10; 348/468
[58] Field of Search ............ 348/731, 11, 10, 348/468, 385, 386, 387, 553, 563, 569, 570, 725; 370/50, 73; H04N 7/00, 7/08, 5/45, 5/50, 5/455

[56] References Cited

U.S. PATENT DOCUMENTS

| | | | |
|---|---|---|---|
| 4,388,645 | 6/1983 | Cox et al. | 348/468 |
| 4,771,456 | 9/1988 | Martin et al. | 348/11 |
| 4,975,771 | 12/1990 | Kassatly | 348/385 |
| 5,010,499 | 4/1991 | Yee | 348/10 |
| 5,296,931 | 3/1994 | Na | 348/731 |
| 5,311,317 | 5/1994 | Ogura et al. | 348/731 |
| 5,359,601 | 10/1994 | Wasilewski et al. | 370/73 |

FOREIGN PATENT DOCUMENTS 0002942  1/1995  WIPO .................. H04N 7/00

Primary Examiner—David E. Harvey

[57] ABSTRACT

A video communication system includes a microprocessor for operating a tuner to select desired television channels in response to the input of corresponding channel numbers. A video data application program is stored in a memory that is accessible to the microprocessor for providing an on-screen display generator with the video data program information for display. The microprocessor identifies the video data application program by a phantom channel number and when that channel number is input by the user, the microprocessor decodes it and accesses the memory location of the video data application program and activates the on-screen display generator.

7 Claims, 2 Drawing Sheets

USE OF TRANSMITTER ASSIGNED PHANTOM CHANNEL NUMBERS FOR DATA SERVICES

BACKGROUND OF THE INVENTION AND PRIOR ART

This invention relates to video communication systems and in particular to video communication system in which selected channel numbers, referred to hereinafter as phantom channel numbers, are used to access particular video services, such as an internally generated electronic program guide menu, downloaded sports score programs, weather reports, set up menus and the like. The benefit is that the viewer (user) needn't access a special menu to view a desired data program. Rather the viewer simply accesses the desired video data program by a channel number, just as is done for regular television viewing. As far as the viewer is concerned, it appears as if the cable company has an expanded number of channels available. Yet, the bandwidth of the cable system is not affected in the least since the video data program information may readily be downloaded in the vertical intervals of conventional television programs or downloaded via an out-of-band. data receiver.

OBJECTS OF THE INVENTION

A principal object of the invention is to provide a novel video communication system.

Another object of the invention is to provide video data programs to users under, the guise of channel numbers.

A further object of the invention is to provide a video communication system that is simple for a user to operate.

BRIEF DESCRIPTION OF THE DRAWING

These and other objects and advantages of the invention will be apparent upon reading the following description in conjunction with the drawings, in which.

DESCRIPTION OF THE PREFERRED EMBODIMENT

Figure 1:
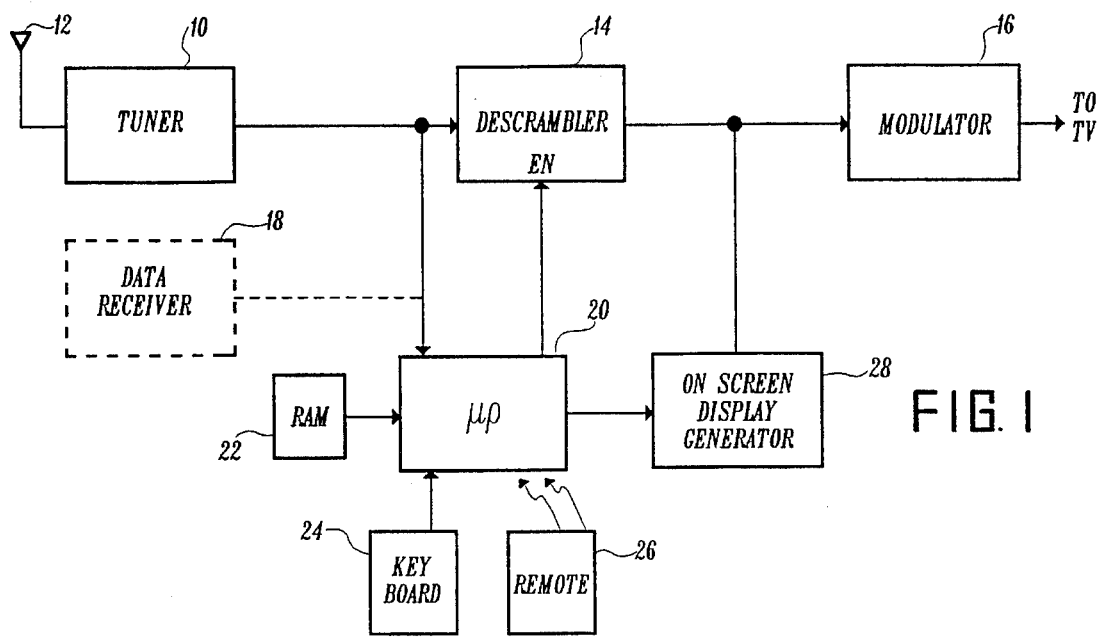
FIG. 1 is a block diagram of a cable converter incorporating the invention.

Referring to FIG. 1, a television tuner 10 is supplied with a range of television signals by means of an antenna 12. It will be appreciated that antenna 12 is for illustrative purposes only and that with equal facility, a cable input may also be provided to tuner 10, either as the main input or as an auxiliary input. The output of tuner 10 is supplied to a descrambler 14 which in turn is supplied to a modulator 16, where the recovered signal is remodulated onto a selected channel, i.e. channel 3 or 4, and supplied to a television receiver (not shown). The output of tuner 10 is also supplied to microprocessor 20 in which suitable decoding circuitry is provided for determining whether the particular subscriber is authorized to receive the televised video program. Consequently, the microprocessor 20 is coupled to the enable input of descrambler 14 for enabling descrambling of authorized televised video programs. A data receiver 18 is illustrated in dashed lines and is shown as supplying information to microprocessor 20. Microprocessor 20 has access to a RAM memory 22 and in turn is provided with input selection information via a keyboards 24. A remote input is also provided to microprocessor 20 and is illustrated by a remote unit 26. For purposes of the invention, the input selection information provided to microprocessor 20 will be channel numbers. The microprocessor also controls an on-screen display generator 28 which takes the video data information from RAM 22 and puts it into a video display form for mixing with the output of descrambler 14.

In operation, the television tuner 10 is tuned by an appropriate input of a channel number to microprocessor 20 either from keyboard 24 or from remote unit 26. If the television channel number is a conventional channel number (i.e. one that identifies a television channel signal), tuner 10 is controlled to receive the broadcast (or cable) channel signal associated with that channel number. This is conventional and very well known. Thus details of the tuning process are not needed. Microprocessor 20 is also programmed to recognize one or more phantom channel numbers, i.e. channel numbers that do not correspond to broadcast or cable channel television signals, but rather identify particular memory locations in RAM 22 where video data programs reside. When such a phantom channel number is received, the microprocessor 20, rather than causing tuning of tuner 10, accesses the appropriate memory location in RAM 22, running the application program associated with the memory location and couples the application program's output information to on-screen display generator 28 for creating a video display of that data program. Should more than one phantom channel number be utilized, microprocessor 20 needs to be capable of decoding all of the utilized phantom channel numbers and accessing the appropriate memory locations-for running the corresponding application programs.

It will be appreciated that provision of data receiver 18 is for the purpose of the cable head end downloading to its cable subscribers, information for various video data programs. This downloaded information is received by microprocessor 20 and positioned or placed in the appropriate memory locations in RAM 22 for later retrieval. In this manner, updated information can be received by the cable subscriber and loaded into RAM 22 while the cable subscriber is viewing a conventional television program, for example. In other situations, the information in RAM 22 may be preset such as a set up menu for operating the converter unit. The range of applications, of course, is not limited to those discussed and those skilled in the art will readily appreciate the great benefits that are achievable with the invention. Of primary importance is a cable head end with limited channel bandwidth and consequent restricted ability to offer various services to the cable system's subscribers, can now provide a wide range of services, with the subscriber believing that many more channels are being provided than is actually the case. This is so since the phantom channels require no channel bandwidth. Further, the ease of operation to a cable subscriber who is not computer oriented is of extreme importance. The phantom channel numbers that identify the particular video data program may be placed in the subscriber's favorite channel memory, for example, and as far as the subscriber is concerned, the entire system operates just as though the particular video data program was obtained by simply tuning to a particular television channel.

Figure 2:
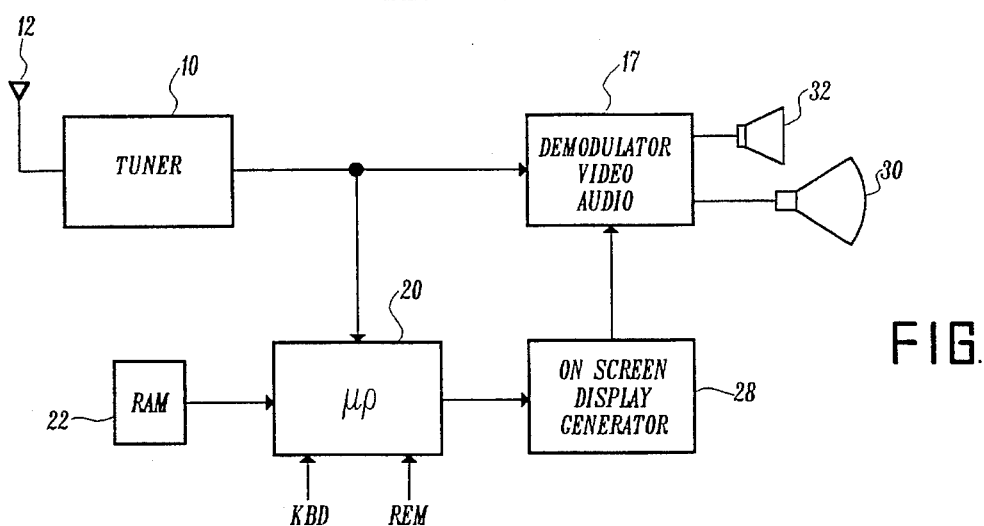
FIG. 2 is a block diagram of a television receiver incorporating the invention.

In FIG. 2, a version of the invention in a conventional television receiver is illustrated. Here the difference is of course that there is no descrambler and a video and audio demodulator 17 are provided for feeding a picture tube 30 and a loudspeaker 32, respectively.

Figure 3:
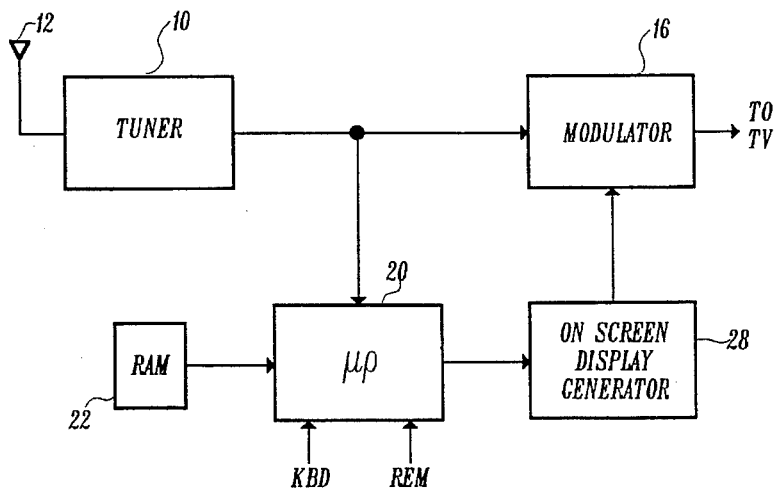
FIG. 3 is a block diagram of a video cassette recorder (VCR) incorporating the invention.

Similarly, in FIG. 3, a system for use in a VCR is shown in which there is no descrambler. In the latter two versions, phantom channel numbers will be used primarily for set up menus and internal programming matters for the television or VCR. Downloading capabilities for advanced television services (FIG. 2), such as electronic program guides could be provided by data in the video or audio channels or in the output of tuner 10.

Figure 4:
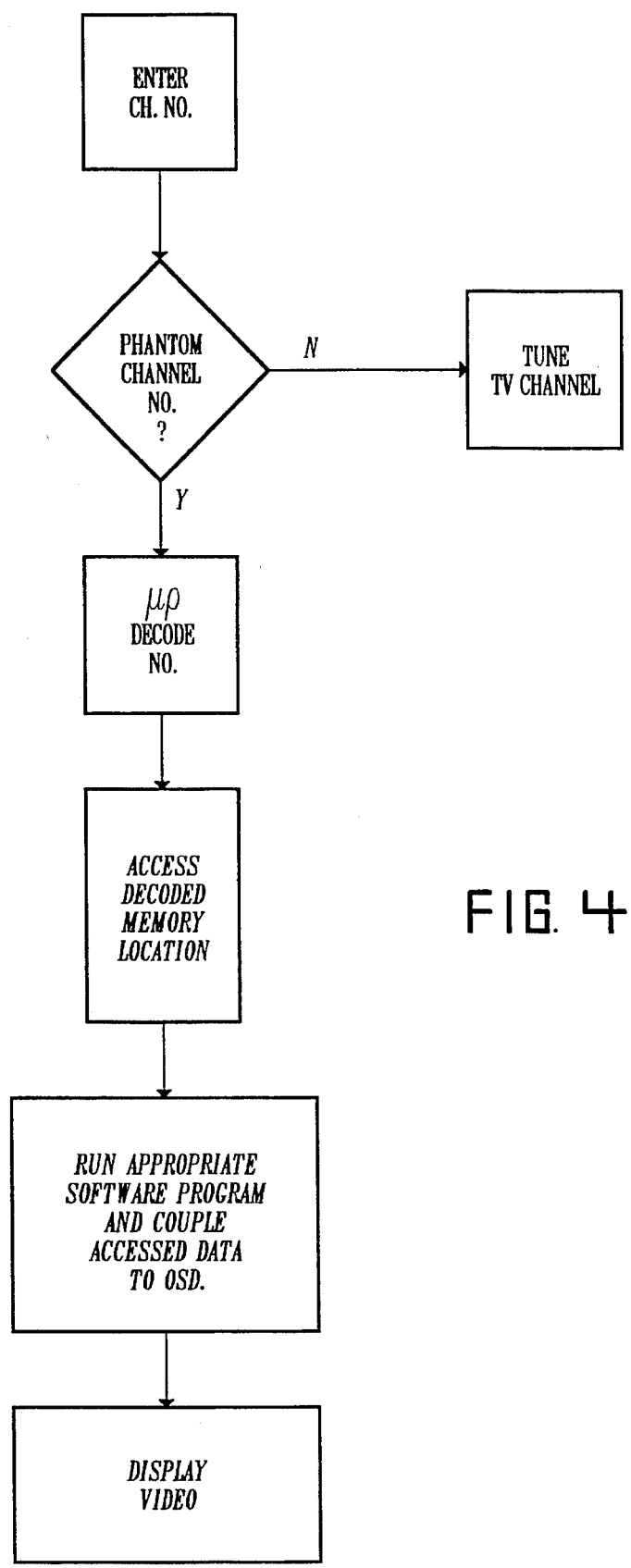
FIG. 4 is a flow chart illustrating operation of the invention.

In FIG. 4, a flow chart for operation of the inventive system is illustrated. The initial step is to enter a channel number and a decision is made as to whether that channel number is a phantom channel number. If it is not a phantom channel number, the television tuner is operated as usual to receive the television channel signal associated with that channel number. If the input number is a phantom channel number, the microprocessor decodes the input number and accesses the memory location, corresponding to that decoded number and couples the accessed video data application program to the on-screen display unit which produces the corresponding video display.

What has been described is a simple technique utilizing phantom channel numbers for accessing various video data programs. It is recognized that numerous changes in the described embodiment of the invention will be apparent to those skilled in the art without departing from its true spirit and scope. The invention is to be limited only as defined in the claims.

What is claimed is:

1. A method of operating a video communication system comprising:

at a transmitter:

assigning channel numbers to broadcast television channel signals;

assigning a phantom channel number to a preselected video data program;

at a receiver:

using a microprocessor to select the broadcast television channel signals in:response to the input of the channel numbers corresponding to the broadcast television channel signals;

using the microprocessor to access a memory containing the preselected video data program in response to the input of the phantom channel number identifying the video data program; and operating an on-screen display generator to generate a video display corresponding to the accessed preselected video data program in the memory.

2. The method of operating a video communication system comprising:

at a transmitter:

assigning channel numbers to broadcast television channel signals;

assigning a phantom channel number to a preselected video data program;

at a receiver:

tuning the broadcast television channel signals in response to the input of the channel numbers corresponding to the broadcast television channel signals;

accessing a memory containing the preselected video data program in response to the input of the phantom channel number identifying the preselected video data program; and generating a video display corresponding to the accessed preselected video data program in the memory.

3. The method of claim 2, further including a microprocessor means for controlling the tuning and the accessing; and using the microprocessor means to decode the phantom channel number identifying the preselected video data program.

4. The method of claim 3, further comprising downloading the video data program from the transmitter to the memory in the receiver.

5. In combination:

a television tuner;

a microprocessor for controlling tuning of said television tuner to broadcast television channel signals in response to inputs of channel numbers;

a memory accessible to said microprocessor;

a video data application program identified in said memory by a transmitter assigned phantom channel number different from said channel numbers;

on-screen displays means for developing a video display from said video data application program; and decoding means in said microprocessor responsive to the input of said transmitter assigned phantom channel number for decoding said transmitter assigned phantom channel number and accessing said memory to cause said on-screen display to display the output of said video data application program.

6. The combination of claim 5 wherein said video data application program is downloaded to said microprocessor for storage in said memory.

7. The combination of claim 6, further including;

a data receiver coupled to said microprocessor for receiving said downloaded video data application program.

\* \* \* \* \*

UNITED STATES PATENT AND TRADEMARK OFFICE
CERTIFICATE OF CORRECTION

PATENT NO. : 5,495,295
DATED : February 27, 1996
INVENTOR(S) : Michael E. Long

It is certified that error appears in the above-indentified patent and that said Letters Patent is hereby corrected as shown below:

Column 4:
  In claim 3, line 1, cancel "a", and
  In claim 5, line 10, cancel "displays" and substitute therefor
  -- display --.

Signed and Sealed this

Twenty-first Day of May, 1996

Attest:

BRUCE LEHMAN

*Attesting Officer*      *Commissioner of Patents and Trademarks*